US012677824B2

(12) United States Patent
Best, Jr. et al.

(10) Patent No.: US 12,677,824 B2
(45) Date of Patent: Jul. 14, 2026

(54) SMALL GAME SLING

(71) Applicants:Guy Watkins Best, Jr., Seneca, SC (US); May Watkins Best, Orangeburg, SC (US)

(72) Inventors: Guy Watkins Best, Jr., Seneca, SC (US); May Watkins Best, Orangeburg, SC (US)

( * ) Notice: Subject to any disclaimer, the term of this patent is extended or adjusted under 35 U.S.C. 154(b) by 13 days.

(21) Appl. No.: 18/068,067

(22) Filed: Dec. 19, 2022

(65) Prior Publication Data

US 2024/0196880 A1 Jun. 20, 2024

(51) Int. Cl.
*A01M 31/00* (2006.01)
*F41C 27/00* (2006.01)

(52) U.S. Cl.
CPC ........... *A01M 31/006* (2013.01); *F41C 27/00* (2013.01)

(58) Field of Classification Search
CPC ....... A01M 31/006; F41C 23/02; F41C 27/00; F41C 33/002; Y10S 224/913
USPC ....................................................... 224/103
See application file for complete search history.

(56) References Cited

U.S. PATENT DOCUMENTS

| | | | | |
|---|---|---|---|---|
| 4,327,850 A | * | 5/1982 | Robinson, Jr. ...... | A01M 31/006 |
| | | | | 224/103 |
| D300,346 S | * | 3/1989 | Dale ................... | A63C 11/021 |
| | | | | D22/134 |
| 4,867,359 A | * | 9/1989 | Donovan ............. | A63C 11/023 |
| | | | | 224/264 |
| 5,427,291 A | * | 6/1995 | Smith ................. | A63C 11/025 |
| | | | | 294/149 |
| 2015/0076181 A1 | * | 3/2015 | Seuk .................... | F41C 33/002 |
| | | | | 224/150 |

* cited by examiner

*Primary Examiner* — Nathan J Newhouse
*Assistant Examiner* — Matthew T Theis
(74) *Attorney, Agent, or Firm* — Fox Rothschild LLP

(57) ABSTRACT

A small game sling includes a main body member and a series of individual retention straps or cords attached to each end of the main body member. One end of the retention straps is attached to the main body member, and a loop, ring or clip is preferably attached to the distal end thereof. The main body member includes a pair of flaps, wherein a first flap is positioned on one side of the main body member, and a second flap is positioned on an opposed side thereof. The flaps, in one embodiment, include attachment means, such as snaps, buttons, hook and loop fastener material (Velcro), or any other attachment mechanism so that the flaps may be folded inwardly over the main body member and attached to one another, so that the small game sling may be removably attached to the strap of a rifle, shotgun, or the like.

3 Claims, 9 Drawing Sheets

14

10

20

12

SMALL GAME SLING

BACKGROUND

1. Field of the Invention

The invention relates generally to a sling for carrying small game, such as ducks, turkeys and the like. More specifically, the present invention includes a game sling having a series of cords or straps for carrying small game, and which further includes an attachment mechanism for attaching the game sling to the strap of a shotgun or a rifle.

2. Background

Hunters have always faced the problem of transporting the game out of the woods or natural areas where they have made a successful kill. There are many devices that have been developed over the years to carry big game, small game, and even fish from the hunting or fishing grounds back home.

The following documents disclose devices for transporting small game, such as birds, out of the hunting grounds, and the documents set forth below are hereby incorporated herein by reference, in their entireties:

US Pub. No. 20160050906

A small game carrier and its method of manufacture are described. The small game carrier may be assembled from two strips of material of unequal length, a male connector, a female connector, two D-rings, and a strap adjuster to create a Bandolier style strap, as well as a ring attached to a bolt snap for securing the ring to the strap and a number of strings for forming nooses that can be secured to the ring to secure small game. The Bandolier style strap comprises two components: a first strap comprising a male connector at one end and a first ring at the other end, and a second strap comprising a female connector at one end and a second ring at the other end. The small game carrier can be assembled by connecting the male connector to the female connector and connecting the bolt snap to the two D-rings.

U.S. Pat. No. 9,277,744

The present invention is a lanyard game strap, hauler or tote that can be worn around the neck of a hunter. The strap, hauler or tote contains one type of attachment means for holding both game calls and another type of attachment means for holding game. Several of each type of attachment means are attached to each strap, hauler or tote. The lanyard game strap, hauler or tote is preferably stretchable so as to be comfortable to wear around the neck even when game is attached to the lanyard game strap, hauler or tote that increases the total weight being carried around the hunter's neck.

U.S. Pat. No. 2,904,236

As shown particularly in FIG. 1, the opposite ends of the rope are backturned upon themselves and frictionally slidably received one each within an adjacent one of said sleeve-forming groups 2 and 3, and thereafter said free ends are knotted as at 6 to provide stop elements. Preferably the knots 6 are treated with a moisture resistant adhesive to maintain the permanency thereof. In this manner, spaced game receiving snares 7 are provided, the intermediate portion of the rope 1 between the snares 7 providing a carrying handle 8 which may be engaged by the hand of the hunter or may be hung over the shoulder, or also of equal importance, may be wrapped once about the belt of the hunter.

U.S. Pat. No. 5,277,347

The instant invention consists of a piece of heavy string eighteen or so inches long that is looped about itself, tied at one end of the loop and then subjected to a threading of both sides of the loop through a plurality of compressible, movable small cord locks before the tying of another intermediate knot serving thereby to create a sub-loop between two knots between which is a plurality of compressible, movable small cord locks. It moreover consists of another compressible, movable small cord lock through which both sides of the portion of the looped heavy string beyond the intermediate knot are threaded prior to the tying of the final knot at the other end of the initial heavy string loop to create a second sub-loop and complete assembly of the invention.

US Pub No. 20040222257

A carrying strap for game birds or animals includes a strip of thin, flexible material for passing over a person's shoulder. At each end of the strip of thin, flexible material is a cord having both ends secured to that end of the strip. The length of each cord is sufficient for forming a lark's head knot for holding the neck or extremity of one or more game birds or animals.

However, none of these devices include an attachment mechanism for removably attaching the game sling to the strap of a shotgun or the like. Currently, bird hunters must remember to carry a separate sling, bag, harness, or the like, in order to easily transport their small game from the hunting grounds back to their vehicle or home. It would be desirable to provide a game sling that is removably attachable to the strap of a shotgun, for instance, so that it is easily accessible when needed, and may remain attached to the shotgun strap when not in use.

SUMMARY OF THE INVENTION

In one embodiment, a small game sling includes a main body member and a series of individual retention straps or cords attached to each end of the main body member. One end of the retention straps is attached to the main body member, and a loop, ring or clip is preferably attached to the distal end thereof. The main body member is preferably made from a flexible material, much like straps that are attached to coolers or golf bags, and may include padding or cushioning materials for the comfort of the user.

The main body member is preferably longitudinal in shape, and may further include a pair of flaps, wherein a first flap is positioned on one side of the main body member, and a second flap is positioned on an opposed side of the main body member. The flaps, in one embodiment, include attachment means, such as snaps, buttons, hook and loop fastener material (Velcro), or any other attachment mechanism so that the flaps may be folded inwardly over the main body member and attached to one another.

The small game sling may be attached to a shotgun strap by opening the flaps, placing the shotgun strap in position adjacent to the main body member, and then folding each flap over the shotgun strap. The attachment mechanism may then be engaged to removably secure the game sling to the shotgun strap. To remove the small game sling, a user may simply disengage the attachment mechanism, open the flaps, and remove the small game sling from the shotgun strap. Alternatively, the small game sling may be attached to the shotgun strap via hook and loop fastening material (such as Velcro), snaps, or other suitable attachment means, rather than folding the flaps over the shotgun strap and securing the flaps together. Additionally, when not in use, the small game sling may remain attached to the shotgun strap, so that the user does not forget to bring the small game sling when he or she goes hunting. Moreover, the game sling is easily accessible to a user when it is removably attached to a shotgun strap.

BRIEF DESCRIPTION OF THE DRAWINGS

The drawings and specific descriptions of the drawings, as well as any specific or alternative embodiments discussed, are intended to be read in conjunction with the entirety of this disclosure. The small game sling may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

Figure 1:
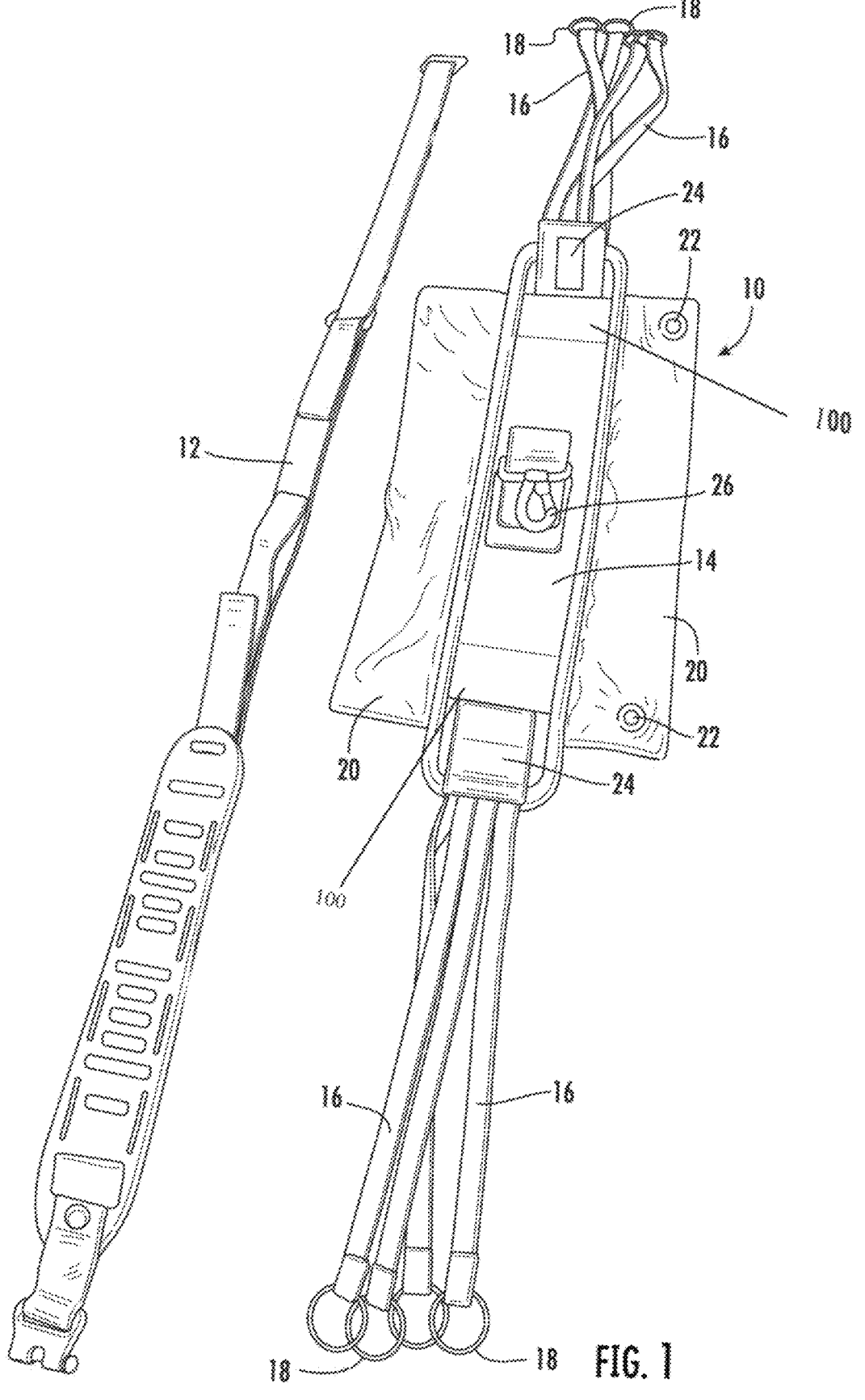
FIG. 1 is a perspective view of one embodiment of a small game sling, illustrating the sling adjacent a shotgun strap, wherein the small game sling includes a padded main body member, a series of retention straps attached to both ends of the main body member, a clip positioned in a central location of the main body member, flaps extending outwardly from the main body member along each longitudinal side thereof, and hook and loop fastening material that may be used to attach the small game sling to the shotgun strap.

The present invention is directed to a small game sling 10 that is used to transport small game, such as birds (ducks, turkeys, dove, and the like), and which may be removably attached to the strap 12 of a shotgun or rifle.

As seen in FIGS. 1-9, in a first embodiment, the small game sling 10 includes a main body member 14 having a first end and a second end. The main body member 14 is preferably padded or cushioned, and may be made from any suitable, flexible material. A plurality of retention straps 16 may be attached to the main body member 14, so that some of the retention straps 16 are attached to one end of the main body member 14, and other retention straps 16 are attached to the second end of the main body member 14. The retention straps 16 preferably include a ring 18 or loop at a distal end thereof, so that the retention straps 16 may be attached around the neck (or foot, or other body part) for carrying the birds. In use, the retention strap 16 is fed through the ring 18 at the end thereof to form a tightening loop, similar to a noose, for attaching the small game thereto. In a preferred embodiment, the number of retention straps 16 attached to the first end of the main body member 14 is equal to the number of retention straps 16 attached to the second end of the main body member 14.

Figure 2:
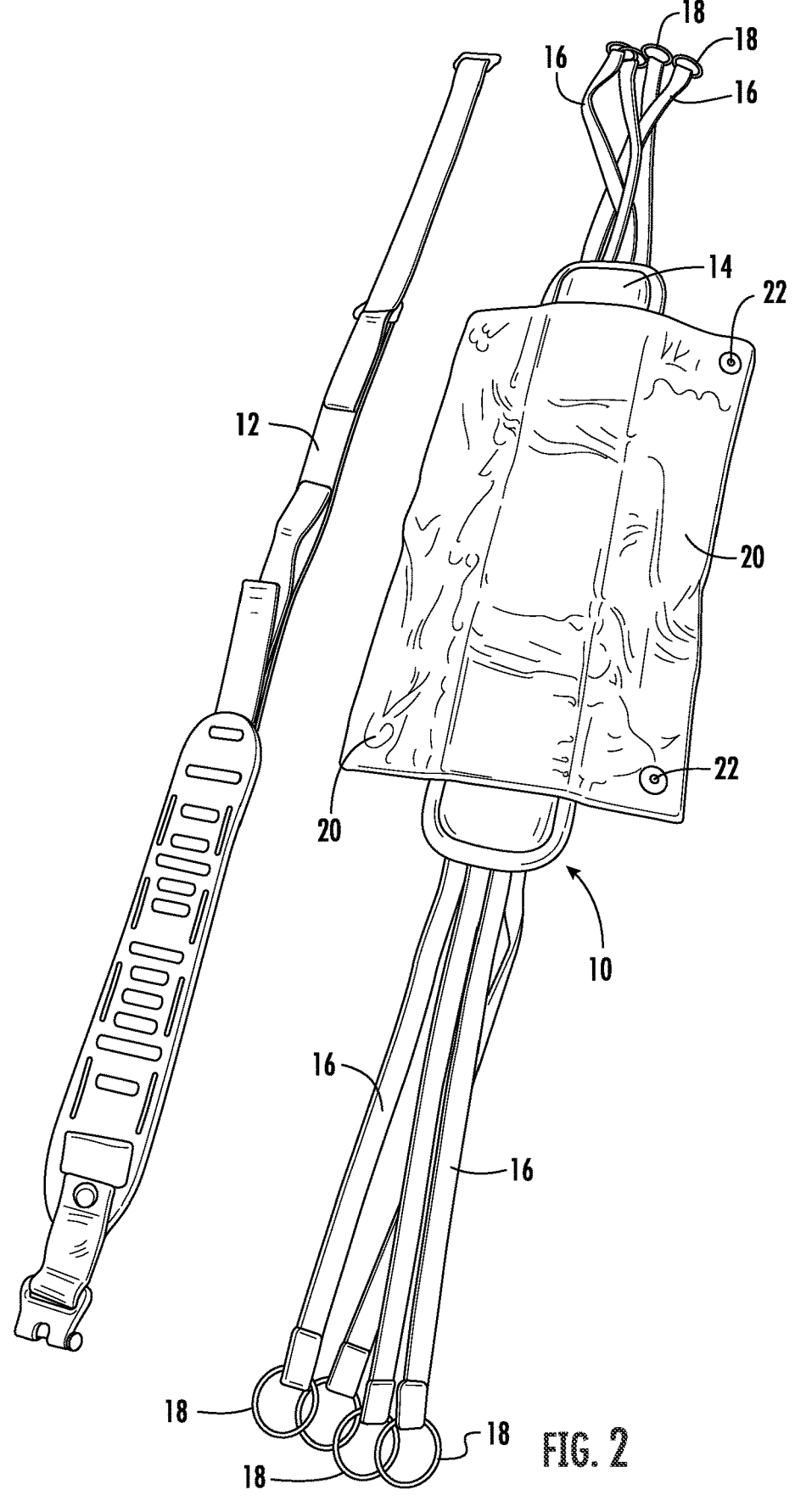
FIG. 2 is a perspective view of the embodiment of a small game sling as shown in FIG. 1, wherein the small game sling is shown from the bottom side, and wherein the flaps are formed from a single sheet of flexible material, and wherein snaps are shown on the flaps for attachment of one flap to the other.
Figure 3:
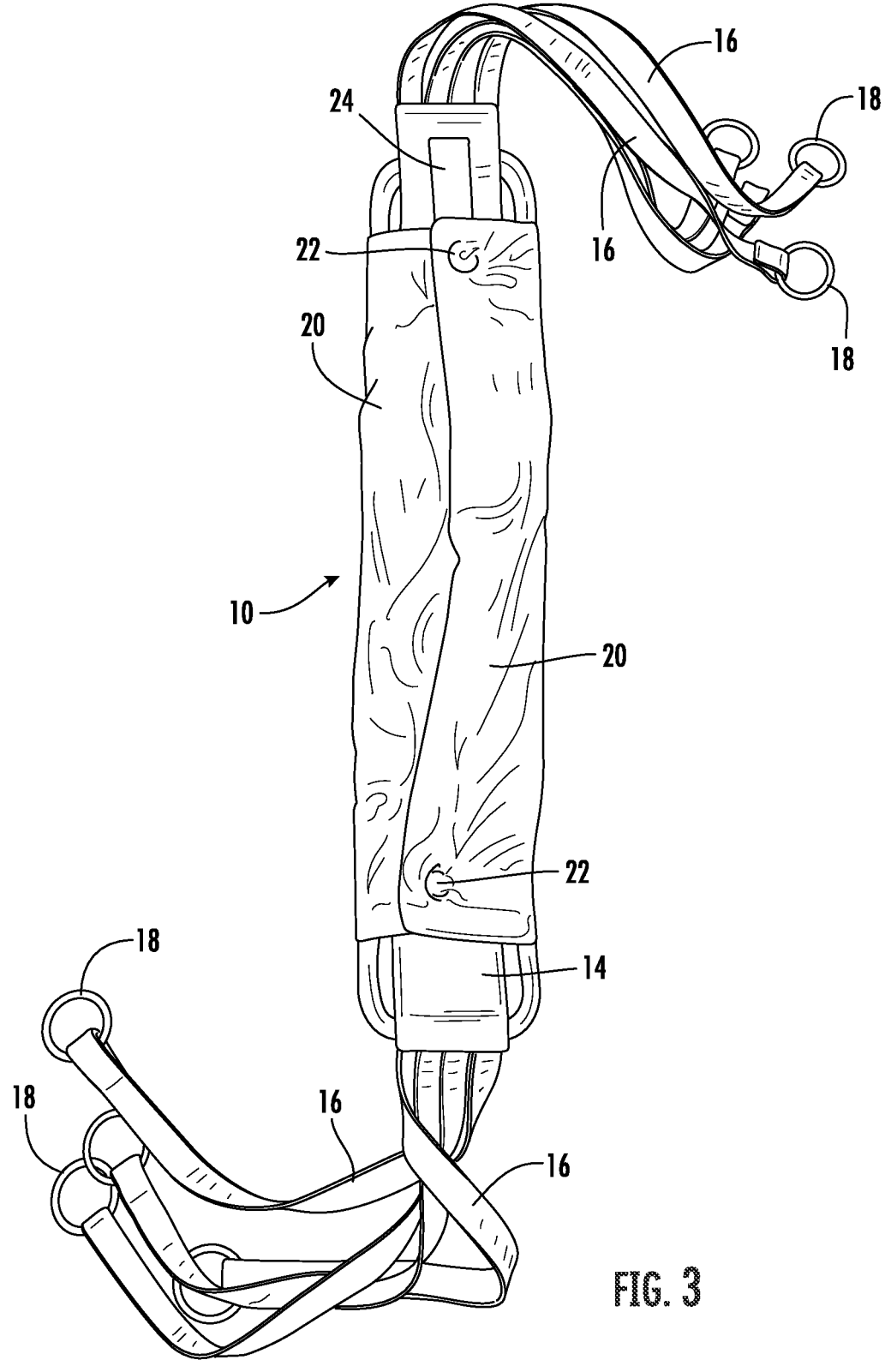
FIG. 3 is a top view of one embodiment of a small game sling, wherein the small game sling is attached to a shotgun strap by folding the flaps over the shotgun strap and snapping the snaps together, while the retention straps hang loosely at either end of the main body member.
Figure 4:
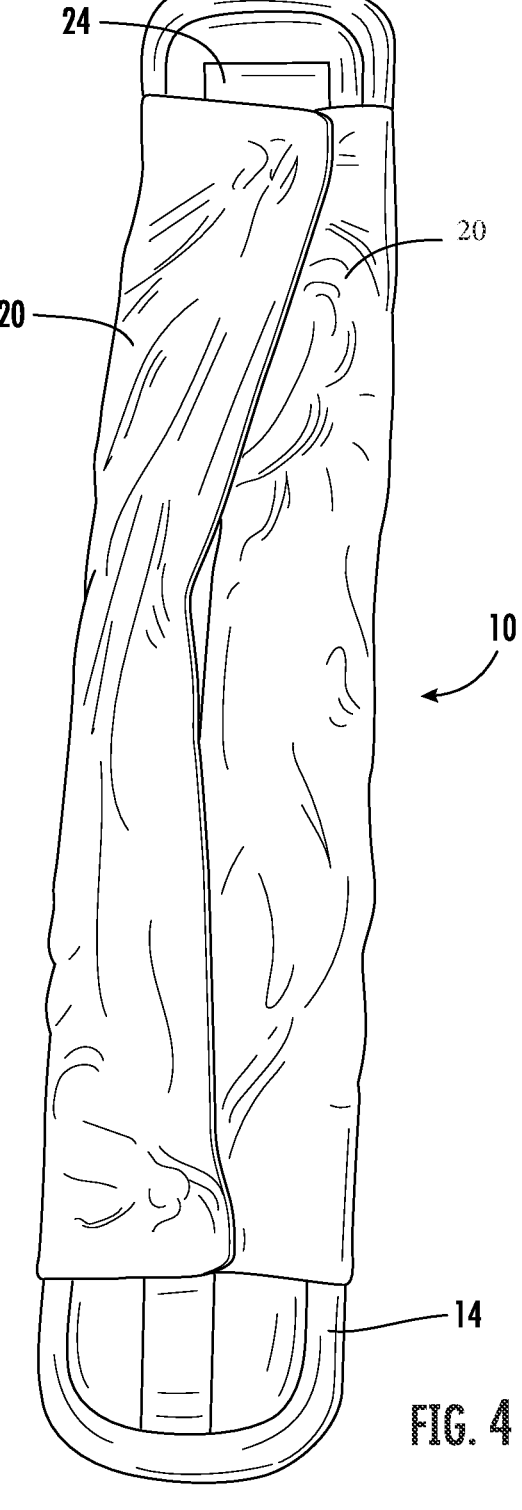
FIG. 4 is a top view of one embodiment of a small game sling, wherein the small game sling is attached to a shotgun strap by folding the flaps over the shotgun strap and snapping the snaps together, while the retention straps are folded inwardly so that they are tucked into the flaps that are snapped together.
Figure 5:
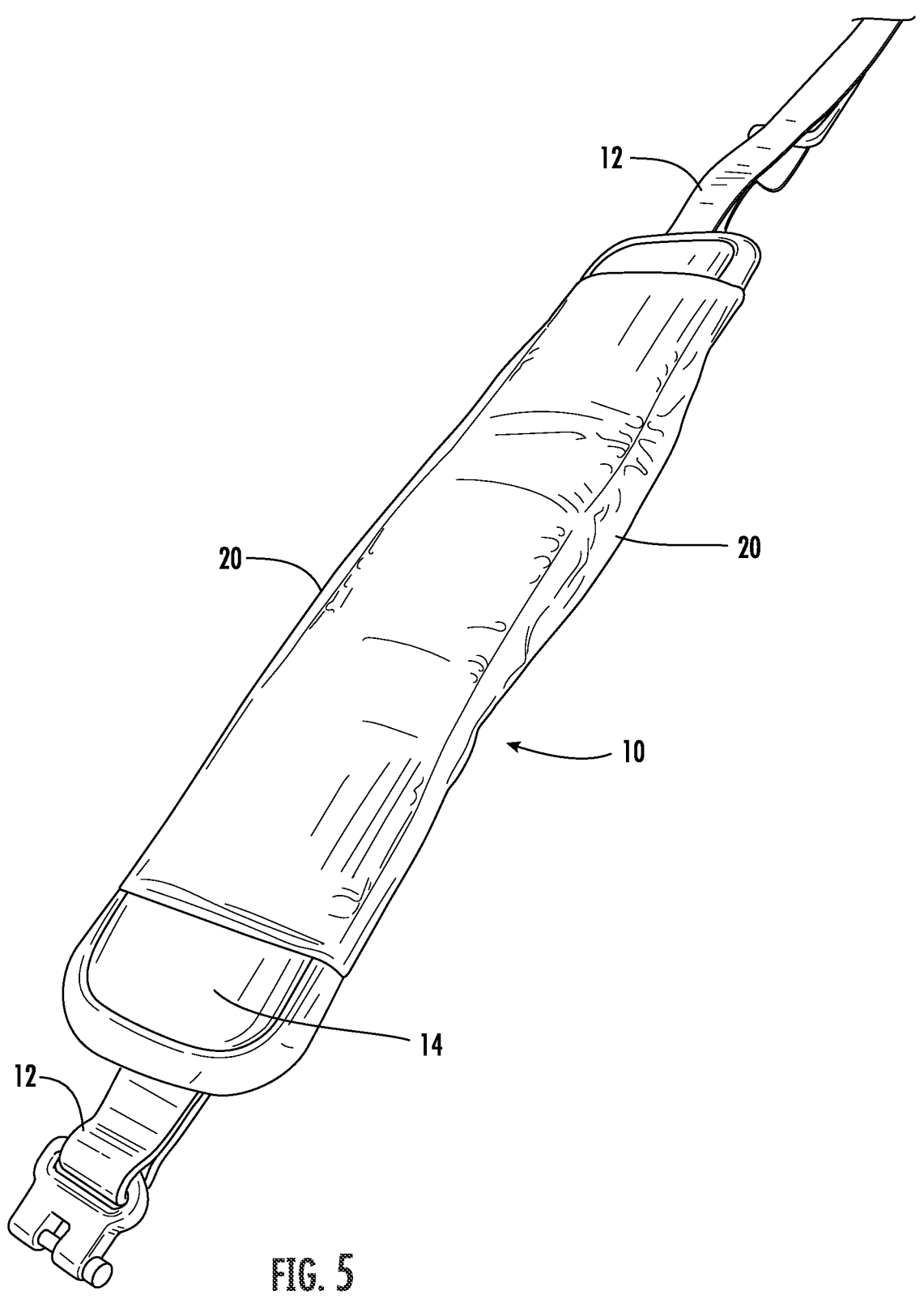
FIG. 5 is a bottom view of one embodiment of the small game sling shown in FIG. 4, wherein the small game sling is attached to a shotgun strap by folding the flaps over the shotgun strap and snapping the snaps together, while the retention straps are folded inwardly so that they are tucked into the flaps that are snapped together.

In one embodiment, a pair of flaps 20 are attached to the longitudinal sides of the main body member as shown in FIG. 1, so that one flap 20 is on one side of the main body member 14, and a second flap 20 is on the opposed side of the main body member 14. The flaps 20 preferably include either snaps 22, buttons, a zipper, hook and loop fasteners, or other types of suitable attachment means so that the flaps 20 may be folded over the main body member 14 and attached together, as shown in FIGS. 3-5, forming a kind of sleeve. It should be understood that the flaps 20 may be folded over the top face of the main body member 14, or they may be folded over the bottom face of the main body member 14, and may be temporarily secured together in either position, as desired. It should be understood that the flaps 20 may be formed from a single sheet of material that is sewn, adhered, or otherwise attached to one side of the main body member 14, as shown in FIG. 2.

Figure 8:
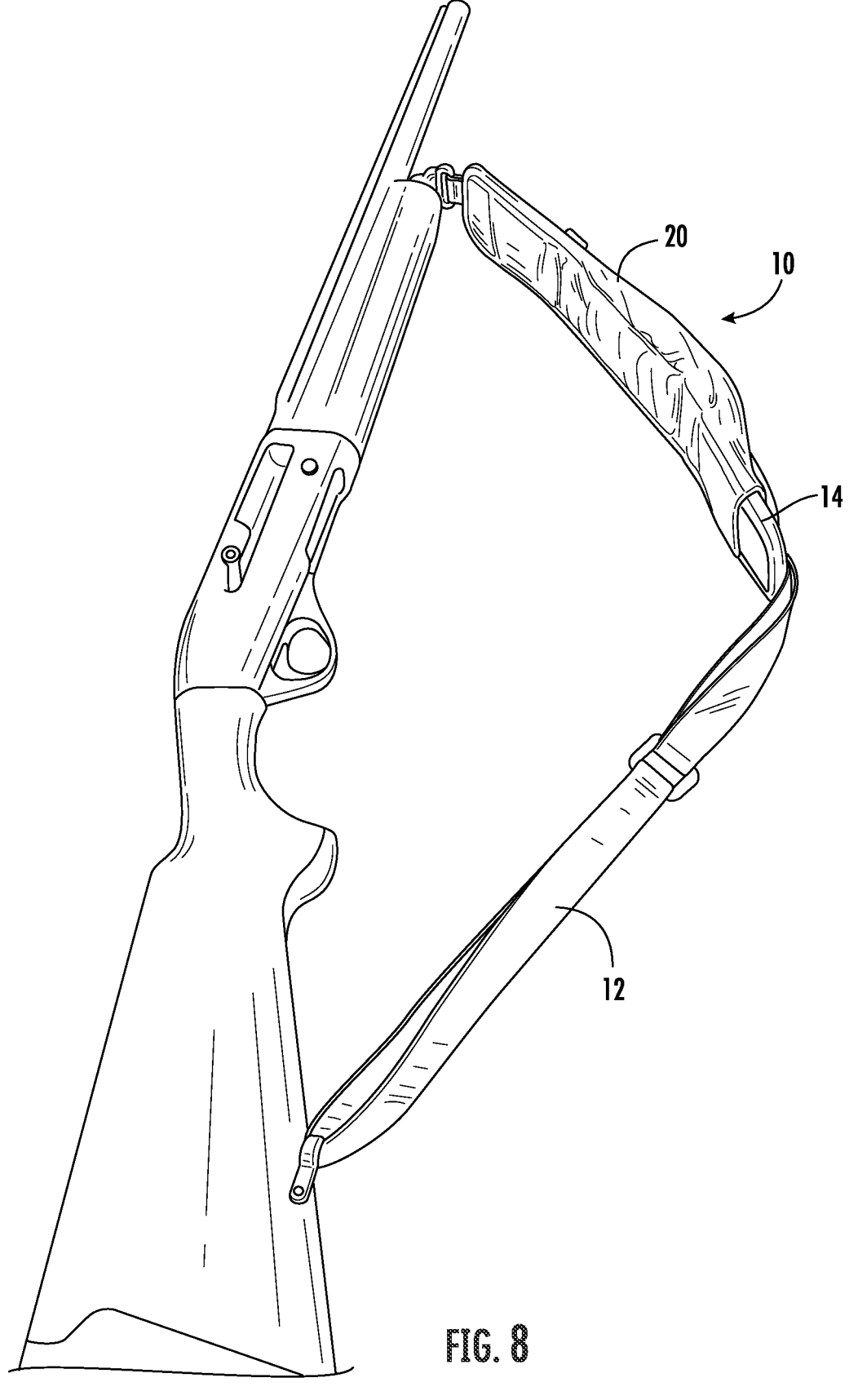
FIG. 8 is a perspective side view of one embodiment of a small game sling, wherein the small game sling is attached to a shotgun strap by folding the flaps over the shotgun strap and attaching the flaps to each other.
Figure 9:
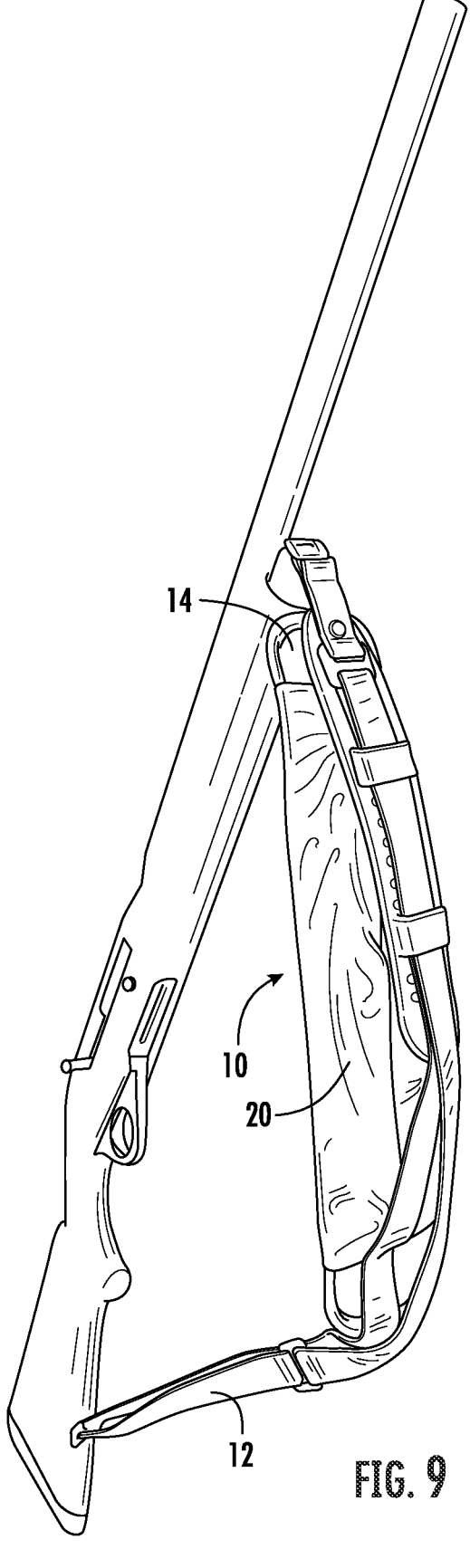
FIG. 9 is a perspective side view of one embodiment of a small game sling, wherein the small game sling is attached to a shotgun strap by hook and loop fastening material.

One method of attaching the small game sling 10 to the shotgun strap 12 is to fold the flaps 20 over the shotgun strap 12 and snap them together as shown in FIG. 8. Alternatively, other attachment mechanisms may be used to attach the small game sling 10 to a shotgun strap 12, including hook and loop fastening material 24, snaps, buttons, or any other suitable attachment means, as shown in FIG. 9.

The main body member 14 may optionally include a clip 26 disposed on one face thereof, so that the small game sling 10 may be temporarily attached to a user's clothing, backpack, etc. Additionally, the main body member 14 may further include flexible retention loops 100 (similar to belt loops) on its top or bottom face, so that the retention straps 16 may be tucked into the flexible retention loops to keep them in a fixed position when not in use.

Figure 6:
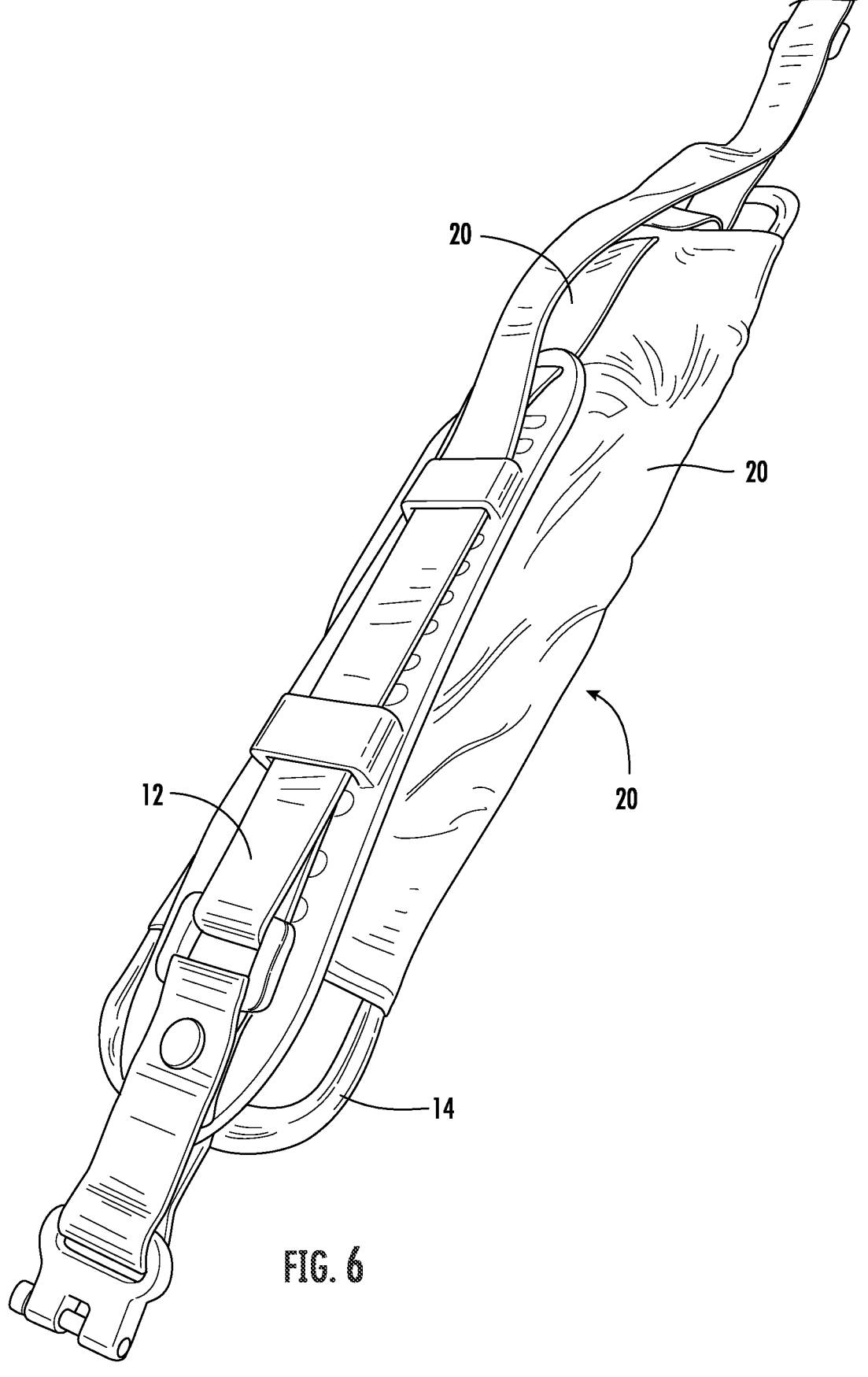
FIG. 6 is a perspective view of one embodiment of a small game sling, wherein the small game sling is attached to a shotgun strap by hook and loop fastening material.
Figure 7:
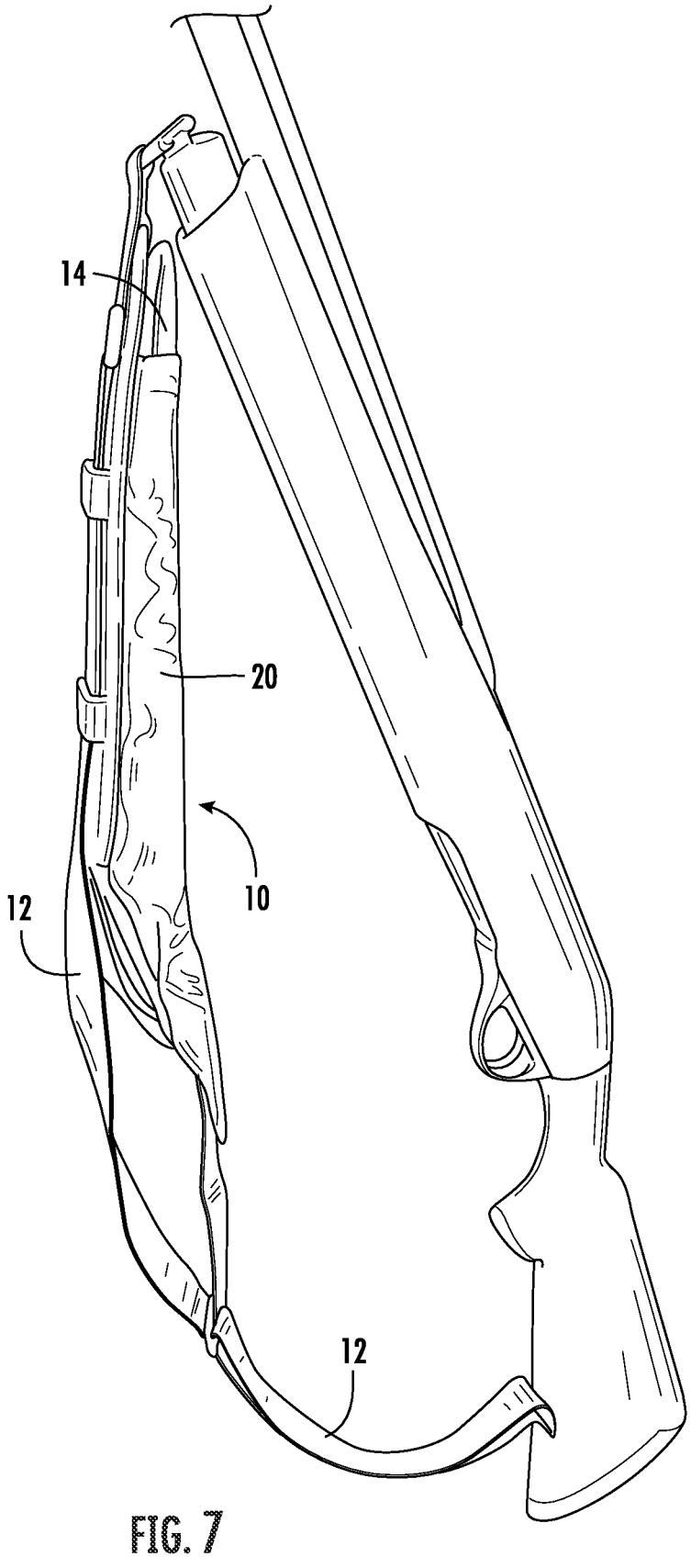
FIG. 7 is a perspective side view of one embodiment of a small game sling, wherein the small game sling is attached to a shotgun strap by hook and loop fastening material.

The small game sling 10 may be attached to a shotgun strap 12 by opening the flaps 20, placing the shotgun strap 12 in position adjacent to the main body member 14, and then folding each flap over the shotgun strap 12, as shown in FIGS. 5 and 8. The snaps 22 may then be engaged to removably secure the small game sling 10 to the shotgun strap 12. To remove the small game sling 10, a user may simply disengage the snaps 22, open the flaps 22, and remove the small game sling 10 from the shotgun strap 12. Alternatively, the small game sling may be attached to the shotgun strap via hook and loop fastening material (as shown in FIGS. 6, 7 and 9), or snaps, buttons, or any other suitable removable attachment mechanism.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments.

For example, the main body member 14 and the retention straps 16 may be made from any suitable material, and the main body member 14 may include cushioning, such as neoprene or a flexible foam material for the comfort of a user. These components may be made from textile materials, such as canvas (or any other suitable material), or a flexible rubber type of material.

It is to be understood that this disclosure is not limited to single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A small game sling comprising:

a main body member having a first end and a second end, a first longitudinal side and a second longitudinal side;

a first retention strap attached to said first end of said main body member, wherein said first retention strap includes a first ring attached to a distal end thereof, so that said retention strap may be fed through said first ring to form a self-tightening noose for securing a game animal thereto;

a second retention strap attached to said second end of said main body member, wherein said second retention strap includes a second ring attached to a distal end thereof, so that said second retention strap may be fed through said second ring to form a self-tightening noose for securing a game animal thereto;

a first flap extending outwardly from said first longitudinal side of said main body member;

a second flap extending outwardly from said second longitudinal side of said main body member;

said first flap and said second flap including an attachment mechanism to removably attach said first flap to said second flap; and a weapon strap adapted to be removably attached to a weapon, wherein said weapon strap is positioned adjacent said main body member and the first and second flaps are folded over the weapon strap and the main body member to removably secure the weapon strap to the main body member, such that said weapon strap remains independently usable when released from said main body member.

2. The small game sling set forth in claim 1, further including at least one retention loop attached to said main body member, so that said retention straps may be removably tucked into said retention loop while said first flap and second flap are in a closed position.

3. The small game sling set forth in claim 1, wherein said attachment mechanism is selected from the group consisting of snaps, buttons, a zipper, and hook and loop fasteners.

* * * * *